United States Patent Office

2,745,860
Patented May 15, 1956

2,745,860

DISPROPORTIONATION OF ALKOXYDISILYL HYDROCARBONS

Donald Leroy Bailey, Buffalo, N. Y., assignor to Union Carbide and Carbon Corporation, a corporation of New York No Drawing. Application October 16, 1952,
Serial No. 315,211

11 Claims. (Cl. 260—448.2)

This invention relates to a method for disproportionating alkoxydisilyl hydrocarbons. More particularly, the invention is concerned with effecting, in an assemblage of disilyl-containing molecules each comprising at least one hydrogen atom and at least one alkoxy group attached to a silicon atom, a redistribution in such fashion that disilyl hydrocarbons and alkoxydisilyl hydrocarbons are obtained.

The redistribution effected may be depicted by the following equations:

$6(R'O)_3SiRSi(OR')_2H \rightleftharpoons H_3SiRSiH_3 +$
$\qquad 5(R'O)_3SiRSi(OR')_3$ $3(R'O)_2HSiRSi(OR')_2H \rightleftharpoons H_3SiRSiH_3 +$
$\qquad 2(R'O)_3SiRSi(OR')_3$ $5R''(R'O)_2SiRSi(OR')_2H \rightleftharpoons R''H_2SiRSiH_3 +$
$\qquad 4R''(R'O)_2SiRSi(OR')_3$ $2R''_2R'OSiRSiR''_2H \rightleftharpoons R''_2HSiRSiR''_2H +$
$\qquad R''_2R'OSiRSiR''_2OR'$ wherein R is a hydrocarbon group comprising only hydrogen and carbon atoms and R' and R'' are alkyl radicals.

As may be seen from the above equations, disproportionation of alkoxydisilyl hydrocarbons will occur, according to my invention, so long as there is present in the molecule at least one hydrogen atom and at least one alkoxy group attached to a, but not necessarily the same, silicon atom. The nature of the hydrocarbon group, R, has no effect whatsoever in the disproportionation reaction. Furthermore, the presence of the alkyl radical R'' attached to a silicon atom does not effect in any manner the redistribution occurring in my invention.

According to the present invention, the disproportionation of alkoxydisilyl hydrocarbons is accomplished by treating such hydrocarbons with a suitable catalyst. For the catalyst I prefer to employ an alkali metal alkoxide, for example, sodium or potassium ethoxide. The amount of catalyst employed is not critical, and, since the preferred catalysts are readily available at reasonable costs, 0.2% or more has been generally employed.

Disproportionation of alkoxydisilyl hydrocarbons containing at least one hydrogen atom and at least one alkoxy group occurs at temperatures below 50° C. However, as the reaction is in equilibrium, the disproportionation may be conducted at temperatures above 50° C. and preferably at reflux temperatures. By so doing, it is possible to remove the low-boiling product, that is, the disilyl hydrocarbons, from the reaction mixture and therefore drive the reaction to completion with increased yield.

Disproportionation may be conveniently accomplished by placing the alkoxydisilyl hydrocarbon and catalyst in a flask connected to a fractionating column and heating to reflux temperatures. At this point, the disilyl hydrocarbon is evolved from the reaction mixture and may be readily collected at the head end of the column.

The following example more full discloses the invention:

*Example*

In a flask were placed 156 grams of crude tetraethoxydisilylethane $(C_2H_5O)_2HSi-C_2H_4-SiH(OC_2H_5)_2$ and one gram of sodium ethoxide. The flask was connected to a fractionating column and the mixture heated for six hours at reflux temperatures. Analysis of the products disclosed a yield of 8.2 grams of disilylethane $H_3Si-C_2H_4-SiH_3$. Hexaethoxydisilylethane was also obtained. Disilylethane is a new compound and was identified by its hydrolyzable hydrogen content. It has the following properties:

$H_3Si-C_2H_4-SiH_3$
Boiling point: 45°–48° C.
Specific gravity: .69
Hydrolyzable hydrogen: 1482 cc. per gram (theory— 1492)

In the above example, the crude tetraethoxydisilylethane contained varying amounts of the tri-, penta-, and hexaethoxydisilylethanes. These compounds disproportionated to disilylethane and hexaethoxydisilylethane.

The disilyl hydrocarbons prepared from the method of my invention are new compositions of matter and may be represented by the following formula:

$H_3Si-R-SiH_3$ wherein R is a hydrocarbon group containing only carbon and hydrogen atoms.

I claim:

1. A process of disproportionating an alkoxydisilyl hydrocarbon containing at least one hydrogen atom attached to a silicon atom and at least one alkoxy radical attached to a silicon atom, which comprises treating said alkoxydisilyl hydrocarbon with an alkali metal alkoxide and recovering a disilyl hydrocarbon.

2. A process of disproportionating an alkoxydisilyl hydrocarbon containing at least one hydrogen atom attached to a silicon atom and at least one alkoxy radical attached to a silicon atom, which comprises treating said alkoxydisilyl hydrocarbon at a temperature below 50° C. with an alkali metal alkoxide, whereby there is produced a reaction mixture containing a disilyl hydrocarbon and an alkoxydisilyl hydrocarbon.

3. A process of disproportionating an alkoxydisilyl hydrocarbon containing at least one hydrogen atom attached to a silicon atom and at least one alkoxy radical attached to a silicon atom, which comprises treating said alkoxydisilyl hydrocarbon at reflux temperatures with an alkali metal alkoxide and recovering a disilyl hydrocarbon.

4. A process of disproportionating an alkoxydisilyl hydrocarbon containing at least one hydrogen atom attached to a silicon atom and at least one alkoxy radical attached to a silicon atom, which comprises treating said alkoxydisilyl hydrocarbon at a temperature above 50° C. with an alkali metal alkoxide and recovering a disilyl hydrocarbon.

5. A process of disproportionating alkoxydisilylalkanes containing at least one hydrogen atom attached to a silicon atom and at least one alkoxy radical attached to a silicon atom, which comprises treating said alkoxydisilylalkane with an alkali metal alkoxide and recovering a disilylalkane.

6. A process of disproportionating alkoxydisilylalkanes containing at least one hydrogen atom attached to a silicon atom and at least one alkoxy radical attached to a silicon atom, which comprises treating said alkoxydisilylalkane at a temperature below 50° C. with an alkali metal alkoxide, whereby there is produced a reaction mixture containing a disilylalkane and an alkoxydisilylalkane.

7. A process of disproportionating alkoxydisilylalkanes containing at least on hydrogen atom attached to a silicon atom and at least one alkoxy radical attached to a silicon atom, which comprises treating said alkoxydisilylalkane at reflux temperatures with an alkali metal alkoxide and recovering an alkoxydisilylalkane.

8. A process of disproportionating an alkoxydisilylethane containing at least one hydrogen atom attached to a silicon atom and at least one alkoxy radical attached to a silicon atom which comprises treating said alkoxydisilylethane with an alkali metal alkoxide and recovering disilylethane.

9. A process of disproportionating an alkoxydisilylethane containing at least one hydrogen atom attached to a silicon atom and at least one alkoxy radical attached to a silicon atom which comprises treating said alkoxydisilylethane at reflux temperatures with an alkali metal alkoxide and recovering disilylethane.

10. A process of disproportionating an alkoxydisilylethane containing at least one hydrogen atom attached to a silicon atom and at least one alkoxy radical attached to a silicon atom which comprises treating said alkoxydisilylethane with sodium ethoxide and recovering disilylethane.

11. A process of disproportionating an alkoxydisilylethane containing at least one hydrogen atom attached to a silicon atom and at least one alkoxy radical attached to a silicon atom which comprises treating said alkoxydisilylethane at reflux temperatures with sodium ethoxide and recovering disilylethane.

References Cited in the file of this patent

UNITED STATES PATENTS

| | | |
|---|---|---|
| 2,276,094 | Rothrock | Mar. 10, 1942 |
| 2,530,367 | Hance | Nov. 21, 1950 |
| 2,627,451 | Erickson | Feb. 3, 1953 |
| 2,632,013 | Wagner | Mar. 17, 1953 |

FOREIGN PATENTS

| | | |
|---|---|---|
| 961,878 | France | Nov. 28, 1949 |

OTHER REFERENCES

Calingaert et al.: "Journal Am. Chem. Soc.," vol. 61 (1939) pp. 2748–54.

Peppard et al.: "Journal Am. Chem. Soc.," vol. 68 (1946) pp. 77–79.

Volnov: "Journal Gen. Chem." USSR, vol. 17 (1947) pp. 1428–35.